US009300585B2

(12) United States Patent
Kumar et al.

(10) Patent No.: US 9,300,585 B2
(45) Date of Patent: Mar. 29, 2016

(54) SHORTENING OF SERVICE PATHS IN SERVICE CHAINS IN A COMMUNICATIONS NETWORK (71) Applicant: CISCO TECHNOLOGY, INC., San Jose, CA (US)

(72) Inventors: Surendra M. Kumar, San Ramon, CA (US); Nagaraj A. Bagepalli, Fremont, CA (US); Dileep K. Devireddy, San Jose, CA (US); Abhijit Patra, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 180 days.

(21) Appl. No.: 14/081,772

(22) Filed: Nov. 15, 2013

(65) Prior Publication Data
US 2015/0138973 A1 May 21, 2015

(51) Int. Cl.
H04L 12/801 (2013.01)
H04L 12/721 (2013.01)
H04L 12/54 (2013.01)
H04L 12/26 (2006.01)
H04L 12/753 (2013.01)
H04L 12/715 (2013.01)

(52) U.S. Cl.
CPC .............. H04L 47/12 (2013.01); H04L 45/12 (2013.01); H04L 45/38 (2013.01); H04L 47/17 (2013.01); H04L 12/56 (2013.01); H04L 43/026 (2013.01); H04L 45/48 (2013.01); H04L 45/64 (2013.01)

(58) Field of Classification Search
None
See application file for complete search history.

(56) References Cited

U.S. PATENT DOCUMENTS

| 4,769,811 | A | 9/1988 | Eckberg et al. |
| 7,644,182 | B2 | 1/2010 | Banerjee |
| 7,738,469 | B1* | 6/2010 | Shekokar et al. ............. 370/401 |
| 7,814,284 | B1 | 10/2010 | Glass et al. |
| 2004/0109412 | A1 | 6/2004 | Hansson |
| 2005/0204042 | A1 | 9/2005 | Banerjee |
| 2005/0289244 | A1 | 12/2005 | Sahu et al. |
| 2008/0177896 | A1 | 7/2008 | Quinn et al. |
| 2008/0181118 | A1 | 7/2008 | Sharma |

(Continued)

FOREIGN PATENT DOCUMENTS

WO WO2015/073190 5/2015

OTHER PUBLICATIONS

Cisco, Cisco VN-LINK: Virtualization-Aware Networking, 2009.*

(Continued)

Primary Examiner — Vincelas Louis
(74) Attorney, Agent, or Firm — Patent Capital Group (57) ABSTRACT A method is provided in one example embodiment and includes receiving at a network element a flow offload decision for a first service node that includes a portion of a service chain for processing a flow; recording the flow offload decision against the first service node at the network element; and propagating the flow offload decision backward on a service path to which the flow belongs if the first service node is hosted at the network element. Embodiments may also include propagating the flow offload decision backward on a service path to which the flow belongs if the flow offload decision is a propagated flow offload decision and the network element hosts a second service node that immediately precedes the service node on behalf of which the propagated flow offload decision was received and a flow offload decision has already been received by the network element from the second service node.

17 Claims, 10 Drawing Sheets

(56) References Cited

U.S. PATENT DOCUMENTS

| | | |
|---|---|---|
| 2008/0209039 A1 | 8/2008 | Tracey et al. |
| 2009/0003364 A1 | 1/2009 | Fendick et al. |
| 2011/0023090 A1 | 1/2011 | Asati et al. |
| 2011/0255538 A1 | 10/2011 | Srinivasan |
| 2012/0131662 A1 | 5/2012 | Kuik |
| 2013/0003735 A1 | 1/2013 | Chao et al. |
| 2013/0124708 A1 | 5/2013 | Lee |
| 2013/0163594 A1 | 6/2013 | Sharma |
| 2013/0163606 A1 | 6/2013 | Bagepalli et al. |
| 2013/0272305 A1 | 10/2013 | Lefebvre et al. |
| 2013/0311675 A1 * | 11/2013 | Kancherla ............ 709/244 |
| 2014/0036730 A1 | 2/2014 | Nellikar |
| 2014/0105062 A1 | 4/2014 | McDysan |
| 2014/0254603 A1 | 9/2014 | Banavalikar |
| 2014/0279863 A1 | 9/2014 | Krishnamurthy |
| 2014/0280836 A1 | 9/2014 | Kumar et al. |
| 2015/0012988 A1 | 1/2015 | Jeng et al. |
| 2015/0052516 A1 | 2/2015 | French |
| 2015/0074276 A1 | 3/2015 | DeCusatis |
| 2015/0222516 A1 | 8/2015 | Deval |

OTHER PUBLICATIONS

PCT Jan. 19, 2015 International Search Report and Written Opinion from International Application Serial No. PCT/US2014/062244.

Kumar, S., et al., "Service Function Path Optimization: draft-kumar-sfc-sfp-optimization-00.txt," Internet Engineering Task Force, IETF; Standard Working Draft, May 10, 2014.

"ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

U.S. Appl. No. 14/020,649, filed Sep. 6, 2013, entitled "Distributed Service Chaining in a Network Environment," Inventor(s): Surendra M. Kumar, et al.

U.S. Appl. No. 14/037,143, filed Sep. 25, 2013, entitled "Path Optimization in Distributed Service Chains in a Network Environment," Inventor(s): Sourabh Suresh Patwardhan, et al.

U.S. Appl. No. 14/037,210, filed Sep. 25, 2013, entitled "Co-Operative Load Sharing and Redundancy in Distributed Service Chains in a Network Environment," Inventor(s): Maithili Narasimha, et al.

"ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

USPTO Jun. 18, 2015 Non-Final Office Action from U.S. Appl. No. 14/037,210.

Boucadair et al., "Differentiated Service Function Chaining Framework," Network Working Group Internet Draft draft-boucadair-network-function-chaining-03, Aug. 21, 2013.

Quinn, et al., "Network Service Header," Network Working Group Internet Draft draft-quinn-nsh-01, Jul. 12, 2013.

USPTO Oct. 23, 2015 Non-Final Office Action from U.S. Appl. No. 14/020,649.

USPTO Sep. 15, 2015 Non-Final Office Action from U.S. Appl. No. 14/037,143.

USPTO Nov. 23, 2015 Final Office Action from U.S. Appl. No. 14/037,210.

* cited by examiner

SHORTENING OF SERVICE PATHS IN SERVICE CHAINS IN A COMMUNICATIONS NETWORK

TECHNICAL FIELD

This disclosure relates in general to the field of communications networks and, more particularly, to a technique for shortening service paths in service chains in such communications networks.

BACKGROUND

"Service chaining" involves delivering a list of services in connection with selected traffic in a specific order. A network node that selects, or classifies, the traffic is referred to as the "classifier." Services are delivered in service nodes. The actual forwarding path used to realize the service chain is referred to as the "service path." Currently, service paths are realized in the form of overlays, which stretch within network infrastructure or between the infrastructure and service nodes. In other words, overlays extend from the classifier to the service node and from service node to service node. The overlays are in the form of transport encapsulation, such as UDP, GRE/NVGRE, VLXAN, SNAP, etc., carrying the original traffic to be serviced as payload. In all such overlay schemes, a service header, such as vPath or NSH, is layered in between the L3 protocol or L4 port numbers. The service headers serve to carry metadata from the classifier to service nodes as well as from one service node to the other service nodes. Additionally, the same service headers carry metadata from the service nodes back to the infrastructure to enable advanced functions to be performed.

One such advanced function is "flow offload." Flow offload occurs when a service node is not interested in the packets of the flow form a certain point in the life of the flow and requests the infrastructure to handle the flow on its behalf. Once offloaded, the infrastructure by passes the service node for the life of the flow, thereby shortening the service path for that flow. This shortening of the service path for a flow improves the performance of service delivery for that flow. Currently, this shortening is limited to bypassing the service node at its closest node in the infrastructure, such as the switch to which the service node is connected.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving at a network element a flow offload decision for a first service node including a portion of a service chain for processing a flow; recording the flow offload decision against the first service node at the network element; and propagating the flow offload decision backward on a service path to which the flow belongs if the first service node is hosted at the network element. Embodiments may also include propagating the flow offload decision backward on a service path to which the flow belongs if the flow offload decision is a propagated flow offload decision and the network element hosts a second service node that immediately precedes the service node on behalf of which the propagated flow offload decision was received and a flow offload decision has already been received by the network element from the second service node.

The method may further include recording the flow offload decision against the first service node at each additional network element to which the flow offload decision is propagated and/or providing at the network element a service forwarding table associated with the flow. The service forwarding table may include an entry corresponding to each service node of the service chain hosted by the network element, in which each entry indicates a next hop and a previous hop for the corresponding service node of the service chain. In some embodiments, the network element may include a Virtual Ethernet Module ("VEM") including a distributed virtual switch ("DVS") and the propagating may be implemented by propagating the flow offload decision to the previous hop indicated in the service forwarding table entry corresponding to the first service node. The recording may include indicating in the service forwarding table that the first service node has been offloaded for the flow.

In some embodiments, the method may include forwarding a packet of the flow received at the network element to a next hop service node as indicated by the service forwarding table, in which if a corresponding service table entry indicates that the next hop service node has been offloaded, the packet is forwarded to a first next hop service node in the service chain that has not been offloaded.

Example Embodiments

Figure 1:
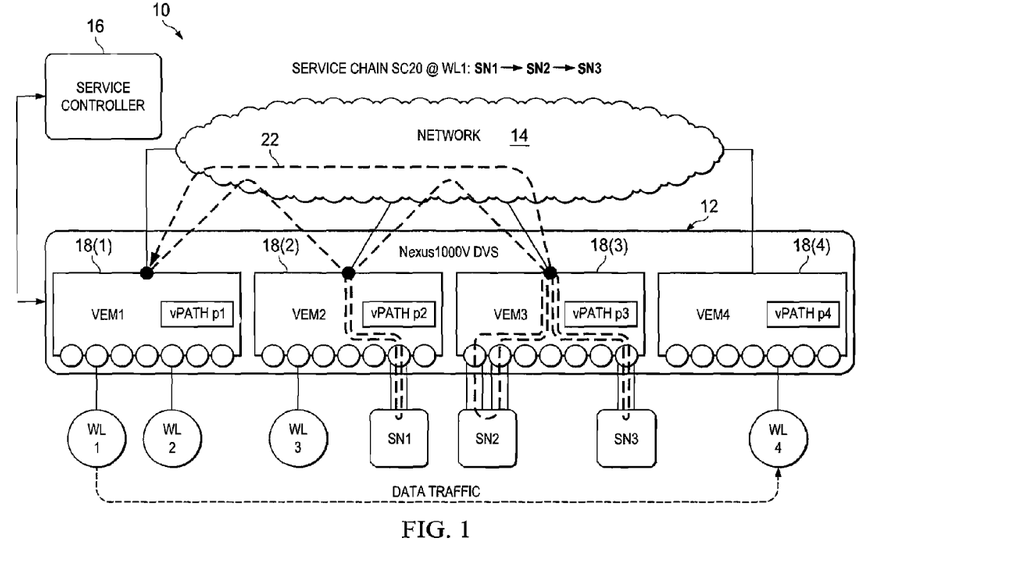
FIG. 1 is a simplified block diagram illustrating a communication system for distributed service chaining in a network environment.

FIG. 1 is a simplified block diagram illustrating a communication system 10 for performing distributed service chaining in a network environment in accordance with an example embodiment. As shown in FIG. 1, the system 10 includes a distributed virtual switch ("DVS") 12 connected to an access network 14. A service controller 16 may also be connected to or integrated into the DVS 12. In one embodiment, the DVS 12 may be implemented as a Nexus 1000V ("N1KV") DVS, available from Cisco Systems, Inc., of San Jose, Calif. The remainder of this disclosure will utilize the example of the N1KV and vPath purely for the sake of illustration and example; however, it will be understood that the examples and explanation provided herein are equally applicable to other switching/routing devices in both physical and virtual environments.

A plurality of service nodes SN1-SN3 may provide various network services to packets entering or leaving network 14. A plurality of virtual machines ("VMs") may provide respective workloads, represented in FIG. 1 by workloads WL1-WL4. One or more Virtual Ethernet Modules ("VEMs"), represented in FIG. 1 by VEMs 18(1)-18(4), may facilitate packet forwarding y DVS 12. In various embodiments, DVS 12 may execute in one or more hypervisors in one or more servers (or other computing and networking devices) in system 10. Each hypervisor may be embedded within one of the VEMs 18(1)-18(4) that can perform various data plane functions, such as advanced networking and security, switching between directly attached VMs, and providing an uplink to the network 14. Each VEM 18(1)-18(4) may include a respective vPath p1-p4, each of which may be capable of redirecting traffic to one or more of service nodes SN1-SN3 before it is sent to one of workloads WL1-WL4.

Although only a limited number of SNs, WLs, VEMs and vPaths are shown in the FIGURES for ease of illustration, it will be recognized that any number of such elements may be included in the system 10 within the broad scope of the embodiments. Additionally, SNs and WLs may be distributed within DVS 12 in any suitable configuration, with various VEMs and vPaths provided to appropriately steer traffic.

Embodiments of communication system 10 can facilitate distributed service chaining in network 14. As used herein, the term "service chain" includes an ordered sequence of a plurality of services provided by one or more SNs (e.g., applications, VMs, network appliances, and other network elements that are configured to provide one or more network services) in the network. A "service" may include a feature that performs packet manipulations over and above conventional packet forwarding. Examples of services may include encryption, decryption, intrusion management, firewall implementation, load balancing, wide area network ("WAN") bandwidth optimization, application acceleration, network based application recognition ("NBAR"), cloud services routing ("CSR"), virtual interfaces ("VIPs"), security gateways ("SG"), network analysis, and others. The service may be considered an optimal function performed in a network that provides connectivity to a network user. The same service may be provided by one or more SNs with in a network. In accordance with certain embodiments, a user (e.g., a system administrator) can configure a service chain and provision it directly at an applicable WL (e.g., WL1-WL4). —.

According to various embodiments, VEMs 18(1)-18(4) may generate headers for forwarding packets according to the configured service chain such that substantially all services in the service chain may be provided in a single service loop irrespective of the number of services, with respective VEMs 18(1)-18(4) making independent decisions (e.g., without referring to other VEMs or other network elements) about the next hop decisions in the service chain packet forwarding. As used herein, the term "service loop" refers to a path of the packet from a starting point (e.g., WL1) through various service nodes (e.g., SN SN1, SN2, SN3) of the service chain until termination at its origination (e.g., WL1). As will be described in greater detail below, service chain traffic may be steered over network 14 in a service overlay. It should be noted that in other embodiments, a service loop need not be implemented. In such embodiments (using the example set forth above) the packet may be forwarded at VEM 18(3) without being looped back to VEM 18(1).

As used herein, the term "service controller" includes a process (e.g., instance of a computer program that is executing) that can provision services at one or more SNs according to preconfigured settings, which may be provided at the service controller by a user through an appropriate command line interface ("CLI"), graphical user interface ("GUI"), script, or other suitable means. The term "VEM" includes one or more network interfaces, at least some portions of switching hardware and associated firmware and software, and one or more processes managing the one or more network interfaces to facilitate packet switching in a switch, including a distributed virtual switch (e.g., DVS 12). Service VEMs are VEMs that provide connectivity to service nodes; classifier VEMs provide connectivity to the workloads that function as the initial node in a service chain.

A service overlay encompasses a level of indirection, or virtualization, allowing a packet (e.g., unit of data communicated in the network) destined for a specific workload to be diverted transparently (e.g., without intervention or knowledge of the workloads) to various service nodes as appropriate. The service overlay comprises a logical network built on top of, or overlaying, an existing network, such as network 14 (the underlay). Packets are encapsulated or tunneled to create the overlay network topology. For example, the service overlay may be implemented using a suitable header, referred to as a network service header ("NSH"), with corresponding source and destination addresses relevant to the service nodes in the service chain. As used herein, the term "network service header" includes a data plane header (e.g., metadata) added to frames/packets. The NSH contains information required for service chaining, and metadata added and consumed by SNs SN1-SN3 and WLs WL1-WL4. Examples of metadata include classification information used for policy enforcement and network context for forwarding post service delivery. According to embodiments of communication system 10, each NSH may include a service path identifier identifying the service chain to which a packet belongs, and a location of the packet on the service chain, which can indicate the service hop (NSH aware node to forward the packet) on the service overlay. The service path identifier and the location of the packet can comprise any suitable text, number or combination thereof. In an example embodiment, the service path identifier is a 24 bit number, and the location may be specified by an 8 bit number.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential application.

Service chaining involves steering traffic through multiple services provided by service nodes in a specific order. The traffic may be steered through an overlay network, using encapsulation of the packet to forward it to appropriate service nodes. According to various embodiments, a user may configure (e.g., provision, arrange, organize, construct, etc.) the service chains at service controller 16. Service controller 16 may discover location of service nodes SN1-SN3. In some embodiments, the service chain may be provisioned by service controller 16 in a port profile at respective vPaths p1-p4 associated with specific workloads WL1-WL4 that instantiate the service chains, thereby binding the service policy including the service chain with the network policy included in the port profile. In other embodiments, when service chains are instantiated at a classifier VEM (e.g., VEM 18(1), associated with the initiating workload (e.g., WL1), service controller 16 may be notified of the service chain instantiation. Service controller 16 may assign a path identifier to each instantiated service chain. Service controller 16 may populate service forwarding table entries indicating the next service hop for respective service chains identified by corresponding path identifiers. Service controller 16 may program service forwarding tables at appropriate VEMs 18(1)-18(4) based on service node discovery information.

Traffic may be originating in the access network 14 destined for any of workloads WL1-WL4 or could be originating from one of the workloads destined for another workloads or a destination in the access network 14. The vPath intercepting the traffic acts as the classifier for the service chain. An example service chain ("SC20") comprised of service nodes SN1, SN2 and SN3, originating at workload WL1 and applied to the system 10 will be now illustrated and described. It will be assumed for the sake of example that:

SC20@WL1={SN1, SN2, SN3}

Service node SN1 is hosted on VEM 18(2) and service nodes SN2 and SN3 are hosted on VEM 19(3); accordingly, vPath p2 is responsible for service node SN1 and vPath p3 is responsible for service nodes SN2 and SN3. SC20 is translated to a corresponding service path ("service-path20"), represented in FIG. 1 by a dashed line 22. It will be assumed for the sake of example that service-path20 has been assigned a service path identifier ("Path ID") of "SP20." The infrastructure activities involved in servicing the traffic from workload WL1 to workload WL2 on service-path20 involves the following:

receive-packet-from-WL1@p1→classify-and-impose-service-path20@p1→travesrse-service-path20→forward-original-packet-to-WL2@p1

"Traverse-service-path20" involves steering the traffic through service-path20:

p1→p2→SN1→p2→p3→SN2→p3→SN3→p3

Service path forwarding tables for service-path20 in accordance with current service chaining techniques are illustrated in Tables 1-3 below:

TABLE 1

Service Forwarding Table of vPath p1 for service-path20

| Current-Hop | Next-Hop |
|---|---|
| Start | SN1 |
| p1 | End |

TABLE 2

Service Forwarding Table of vPath p2 for service-path20

| Current-Hop | Next-Hop |
|---|---|
| SN1 | SN2 |

TABLE 3

Service Forwarding Table of vPath p3 for service-path20

| Current-Hop | Next-Hop-SN |
|---|---|
| SN2 | SN3 |
| SN3 | p1 |

Figure 2:
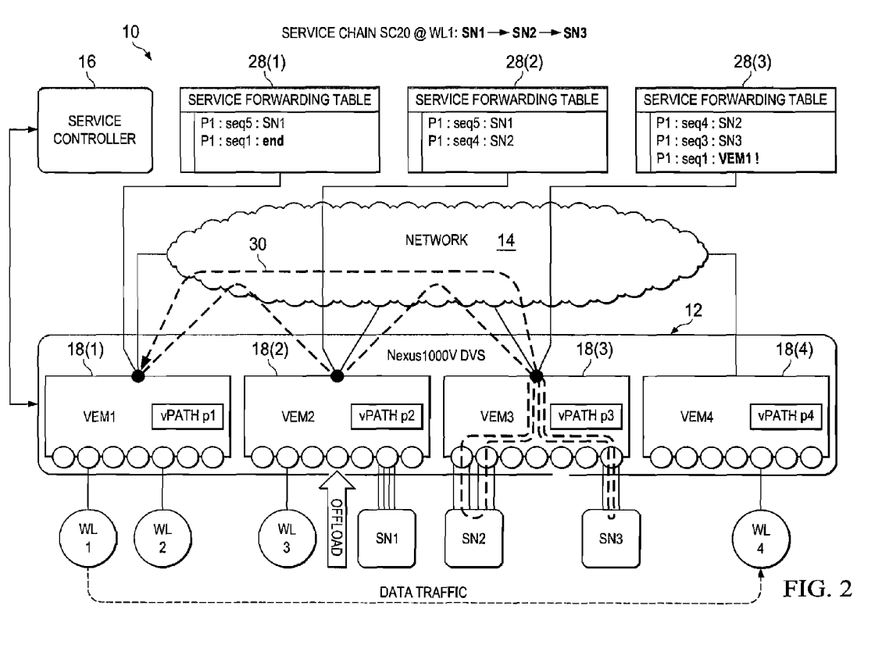
FIGS. 2-3 are simplified block diagrams collectively illustrating an example technique for performing distributed service chaining in a network environment.
Figure 3:
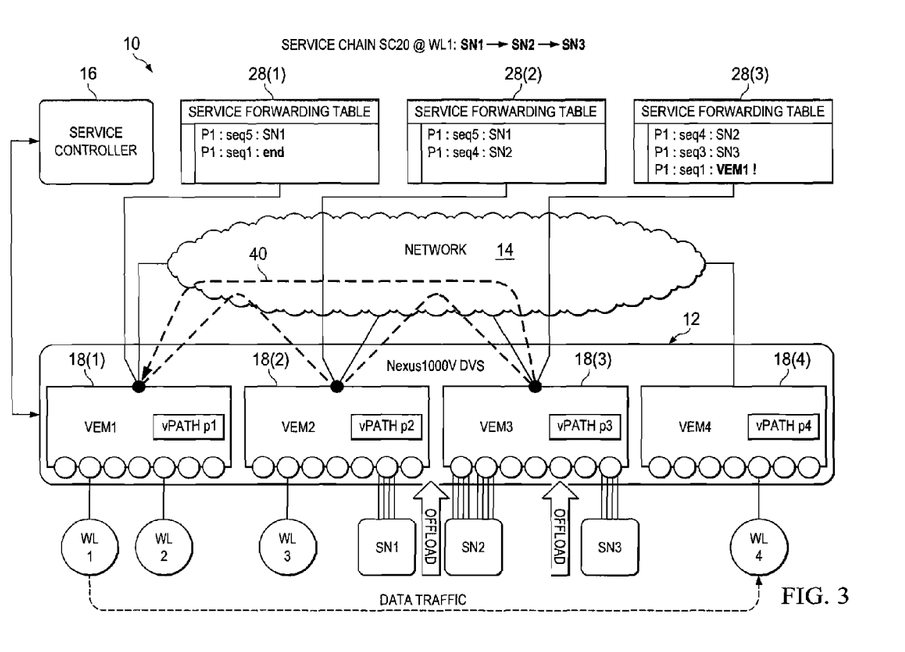

Referring again to the example set forth above with reference to service-path20 and FIGS. 2-3, the following example sequence of offload events is proposed to how offload is handled using previous techniques. When no service node has yet performed a flow offload, service-path20 may be represented:

p1→p2→SN1→p2→p3→SN2→p3→SN3→p3 which has the infrastructure path p1→p2→p3. It will be assumed for the sake of example that at some point during processing, service node SN1 offloads, as illustrated in FIG. 2. Service forwarding tables 28(1), 28(2), and 28(3) are shown for each of the vPaths p1, p2, and p3, respectively, involved in service-path20. As previously described, each of the service forwarding tables 28(1)-28(3) reflect the next hop for each hop of service-path20. Once service node SN1 offloads, service-path20, represented in FIG. 2 by a dashed line 30, becomes:

p1→p2→p3→SN2→p3→SN3→p3 which has the infrastructure path p1→p2→p3. Assuming service node SN2 offloads next, service-path20 would become:

p1→p2→p3→SN3→p3

Assuming the final service node, service node SN3, subsequently offloads, as illustrated in FIG. 3, service-path20, represented in FIG. 3 by a dashed line 40, becomes p1→p2→p3

While the service path p1→p2→p3 is clearly much shorter than the original service path p1→p2→SN1→p2→p3→SN2→p3→SN3→p3, it is still longer than necessary. In particular, once service node SN1 offloads, there is no need to forward traffic to vPath p2/VEM 18(2). Similarly, once both of the service nodes SN2 and SN3 offload, there is no need to forward traffic to vPath p3/VEM 18(3).

A service chaining technique in accordance with embodiments described herein enables not only the service node, but also the associated vPaths and VEMs, to be bypassed in response to a flow offload event for a particular flow. A direct consequence of such bypass is the realization of shortest possible service paths for service flows involving offloads. The implication of such shortest service path is the application of a service chain that does not incur the full latencies involved in serving such a service chain. Reduced latencies translate to improved throughput of the service chain. When multiple such service chains realize this benefit across many different flows, overall system throughput improves. All of the changes required to achieve the shortest service paths are constrained to the infrastructure. Hence, it should be noted that the service nodes themselves are unaware of the optimizations performed by the infrastructure dynamically.

In accordance with embodiments described and illustrated herein, certain extensions are made to the distributed service chaining technique described above to shorten the service path. In particular, the service forwarding table for each vPath is extended to include the previous hop, as well as the next hop. Additionally, flow offload decisions are propagated backwards on a service path. Finally, flow offload decisions from all of the service nodes at a given vPath, as well as the flow offload decision from the next service node on the service path from another vPath, are cached. For purposes of illustration, Table 4 below illustrates the service forwarding table of vPath p3 for service-path20 (Table 2 above) including the aforementioned extension to the table to include the previous hop:

TABLE 4

Service Forwarding Table of vPath p2 for service-path20

| Current-Hop | Next-Hop | Prev-Hop |
|---|---|---|
| SN2 | SN3 | SN1 |
| SN3 | P1 | SN2 |

With regard to flow offload decision propagation, in certain embodiments, an offload decision from a service node, conveyed via the service header, such as vPath, is propagated backward along the service path. This propagation is initiated at the vPath closest to the service node performing the offload. A propagated offload decision received by a vPath is further propagated backwards on the service path. Offload propagation is controlled by the following Propagation Rules:

1. If a VEM/vPath receives a flow offload decision from a service node local to the VEM, the flow offload decision is unconditionally propagated backwards on the service path to which the flow belongs (NOTE: this propagation may be to the same VEM/vPath where it is generated, if the VEM/vPath is responsible for the immediately adjacent service node on the service path);
2. if a VEM/vPath receives a propagated flow offload decision from another VEM/vPath corresponding to a service path, it propagates the received flow offload decision further on the service path (in the same direction it was received) if both of the following conditions are true:
   a. the VEM/vPath hosts a service node that is (ordered) immediately before the service node on behalf of which the propagated flow offload decision is received; and
   b. the VEM/vPath has already received the flow offload decision from the service node local to the VEM and, the local service node in turn is (ordered) immediately before the service node (local or remote) on behalf of which the propagated flow offload decision is received.

It is implicit that the offload decision propagation stops when it reaches the classifier VEM/vPath (i.e., the VEM/vPath that imposed the service header and steered the traffic on the service path).

To illustrate the rules described above, referring to FIG. 1, it will be assumed for the sake of example that service node SN3 has offloaded the flow. When this occurs, in accordance with embodiments described herein, VEM 18(3)/vPath p3 propagates the offload decision corresponding to service node SN3 (which is local to VEM 18(3)/vPath p3) backward to VEM 18(3)/vPath p3, as service node SN2, which is also located on VEM 18(3), is immediately prior to service node SN3. This corresponds to Rule 1 above. Assuming now for the sake of example, service node SN2 has already been offloaded; therefore, VEM 18(3)/vPath 3 has already received an offload decision from service node SN2. In that case, when the propagated offload decision on behalf of service node SN3 is received at vPath p3, the offload decision is propagated to VEM 18(2), which hosts service node SN1, in accordance with Rule 2 because (a) VEM 18(3)/vPath p3 hosts a service node SN2, which immediately precedes the service node on behalf of which the propagated flow offload decision was received (i.e., service node SN3), and (b) a flow offload decision has been received by that immediately preceding node (i.e., service node SN2).

With regard to caching, in certain embodiments, every VEM/vPath that receives the flow offload decision, as described above, caches the decision in its flow table. This serves multiple purposes. First, the vPath on the VEM knows how and what to propagate in the offload decision, and second, when flows are aged-out in the vPaths along the service path, the cached flow offload decision can be propagated back.

In accordance with features of certain embodiments, the offload decisions propagated backwards along the service path and cached at all the network elements in the service path enable service path optimization for a flow, within the network infrastructure. Packets of a flow arriving at a network element are forwarded along the service path to which the flow belongs by first consulting the offload decisions of service nodes, as indicated in the service forwarding table. If the next hop service node has a cached offload decision, packets are not forwarded to that service node; instead, the offloaded service node is bypassed by the network element. In cases in which a service node is bypassed, the network element continues the forwarding decision-making process with the service node that is ordered after the skipped one. This process is repeated until a service node that does not have an offload decision cached against it is located, at which point, packets are forwarded to that service node. As a result, the network element bypasses all of the service nodes that have offloaded the flow to the infrastructure, including those that are not directly connected to the network element. This ultimately leads to a shortest service path for a flow, which in turn leads to reduced latencies and improved performance.

Figure 4:
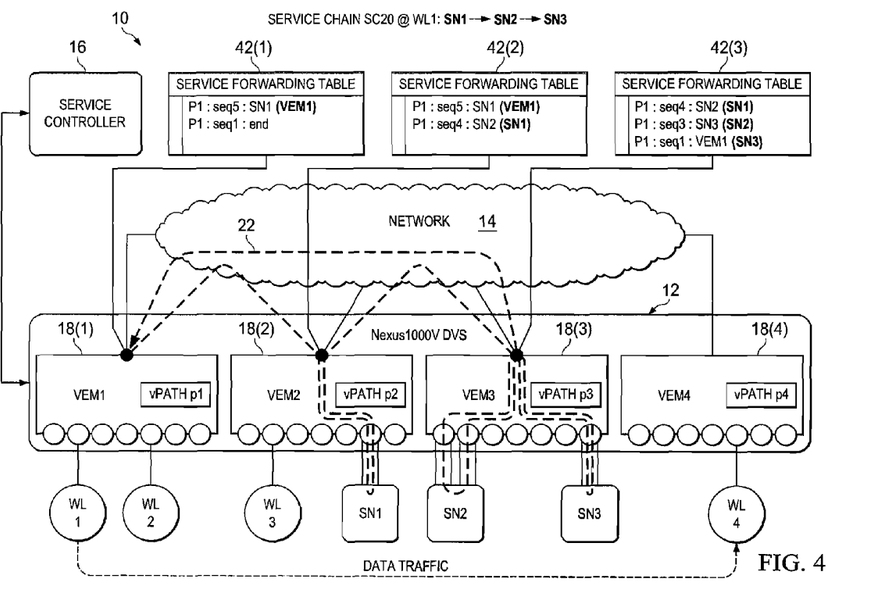
FIGS. 4-7 are simplified block diagrams collectively illustrating details of an embodiment of the present disclosure for performing distributed service chaining in a network environment.
Figure 5:
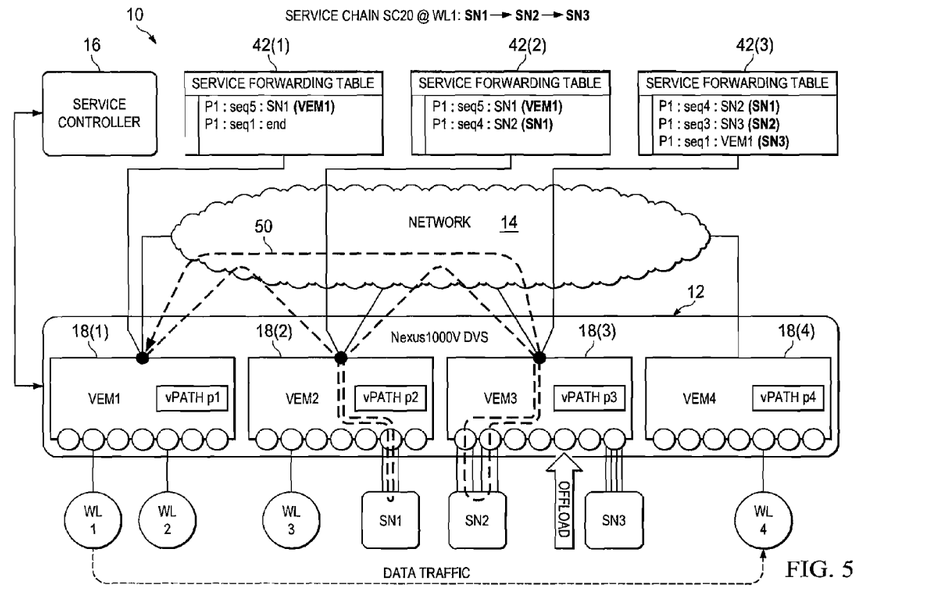

Referring again to the example set forth above with reference to service-path20 and with further reference to FIGS. 4-7, the following example sequence of offload events is proposed to illustrate the service path shortening techniques described herein. It will be assumed for the sake of example that offloading occurs in the following sequence:
1. Service Node SN3 Offloads
2. Service Node SN1 Offloads
3. Service Node SN2 Offloads When no service node has yet performed a flow offload, service-path20 may be represented:
p1→p2→SN1→p2→p3→SN2→p3→SN3→p3
which has the infrastructure path p1→p2→p3. Service forwarding tables 48(1), 48(2), and 48(3) are shown for each of the vPaths p1, p2, and p3, respectively, involved in service-path20 as illustrated in FIG. 4. In accordance with features of embodiments described herein for shortening distributed service chains, each of the service forwarding tables 48(1)-48(3) reflect not only the next hop for each hop of service-path20, but also the previous hop for each current hop of the service-path20. Referring now to FIG. 5, after service node SN3 performs the flow offload, service-path20, represented by a dashed line 50, changes to:
p1→p2→SN1→p2→p3→SN2→p3
which has the infrastructure path p1→p2→p3. When service node SN3 performs the offload, vPath p3 propagates the offload to the vPath hosting the previous service node (in this case, vPath p3 itself) in accordance with Propagation Rule 1 above. As previously noted, this propagation is enabled by the fact that previous hop, as well as next hop, information is indicated in the service forwarding tables 28(1)-28(3) for vPaths p1-p3.

Figure 6:
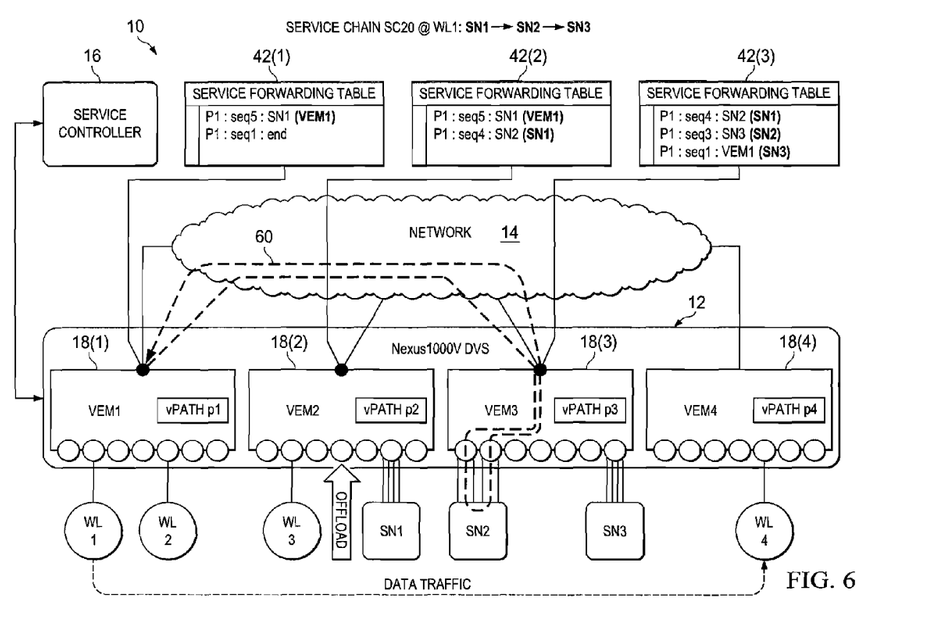

Referring now to FIG. 6, after service node SN1 performs the flow offload, service-path20, represented by a dashed line 60, changes to:
p1→p3→SN2→p3
which has the infrastructure path p1→p3. When service node SN1 performs the offload, vPath p2 propagates the offload to the vPath hosting the previous service node as per Propagation Rule 1, above. Because service node SN1 is the first service node, the previous vPath (vPath1) is the classifier itself. As a result, vPath p2 is completely bypassed.

Figure 7:
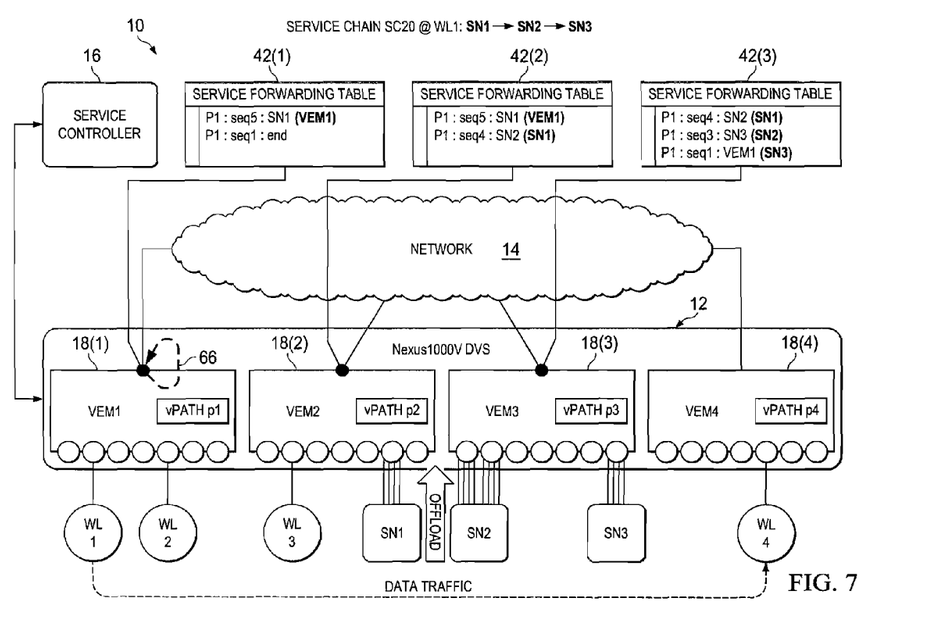

Referring now to FIG. 7, after service node SN2 performs the flow offload, service-path20, represented by a dashed line 66, changes to:
p1
which has the infrastructure path p1. When service node SN2 performs the flow offload, vPath p3 propagates the offload to vPath p2 in accordance with Propagation Rule 1, above. VPath p2 in turn propagates the offload to vPath p1 as per Propagation Rule 2. As a result, vPaths p2 and p3 are completely bypassed. In essence, the service path is the shortest possible service path, comprising just a single vPath, vPath p1.

Embodiments described herein thus bypass the service nodes, as well as the associated vPaths and VEMs, in response to a flow offload event for a given flow. A direct consequence of such bypass is the realization of shortest possible service paths of flows involving offloads. The implication of such shortest service path is the application of a service chain that does not incur the full latencies involved in serving such a service chain. Reduced latencies translate to improved throughput of the service chain. When multiple such service chains realize this benefit across many different flows, overall system throughput improves. All the changes required to achieve the shortest service paths are constrained to the infrastructure. Hence, it should be noted that the service nodes themselves are unaware of the optimizations performed by the infrastructure dynamically.

Figure 8:
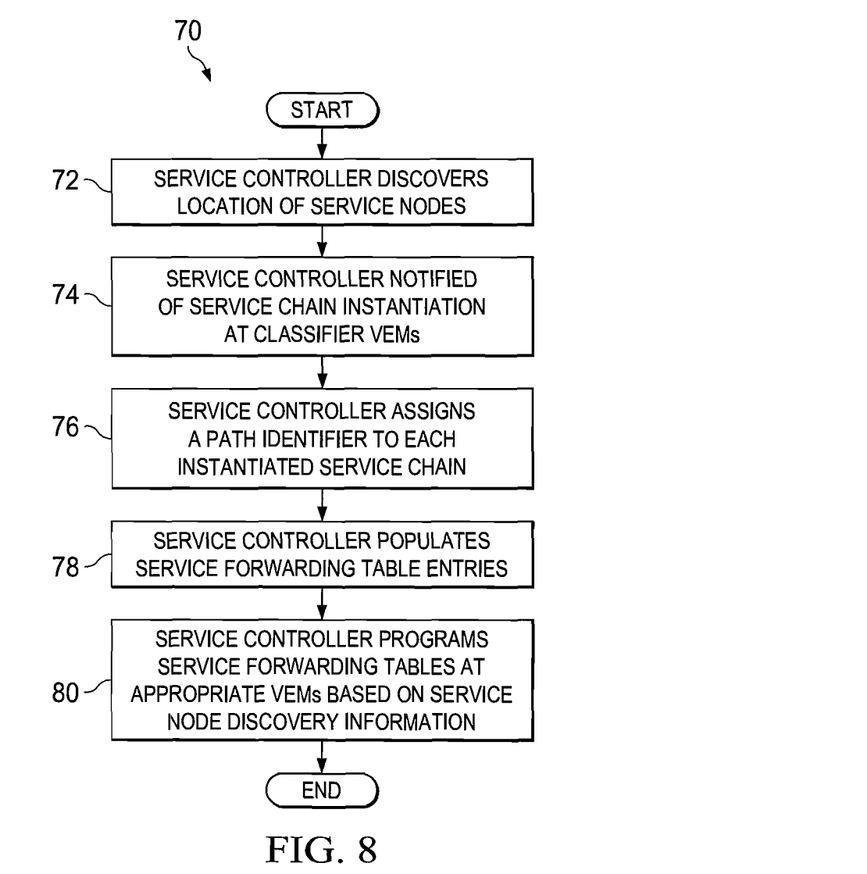
FIG. 8 is a simplified flow diagram illustrating example operations that may be associated with an embodiment of the present disclosure for performing distributed service chaining in a network environment.

FIG. 8 is a simplified flow diagram illustrating example operations 70 that may be associated with an embodiment for shortening service paths in service chains in a communications system, such as the system 10. In step 72, a service controller, such as service controller 16, may discover locations of service nodes 18 in DVS 12. In step 74, when service chains are instantiated at classifier vPaths (e.g., vPath p1), the service controller may be notified of the service chain instantiation. In step 76, the service controller may assign respective service path identifiers to each service chain. In step 78, the service controller may populate service forwarding tables with appropriate entries, including both next hop and previous hop information. In step 80, the service controller may program (e.g., install, implement, execute, etc.) service forwarding tables at respective VEMs (e.g., VEMs 18(1)-18(4)) based on service node discovery information.

Figure 9:
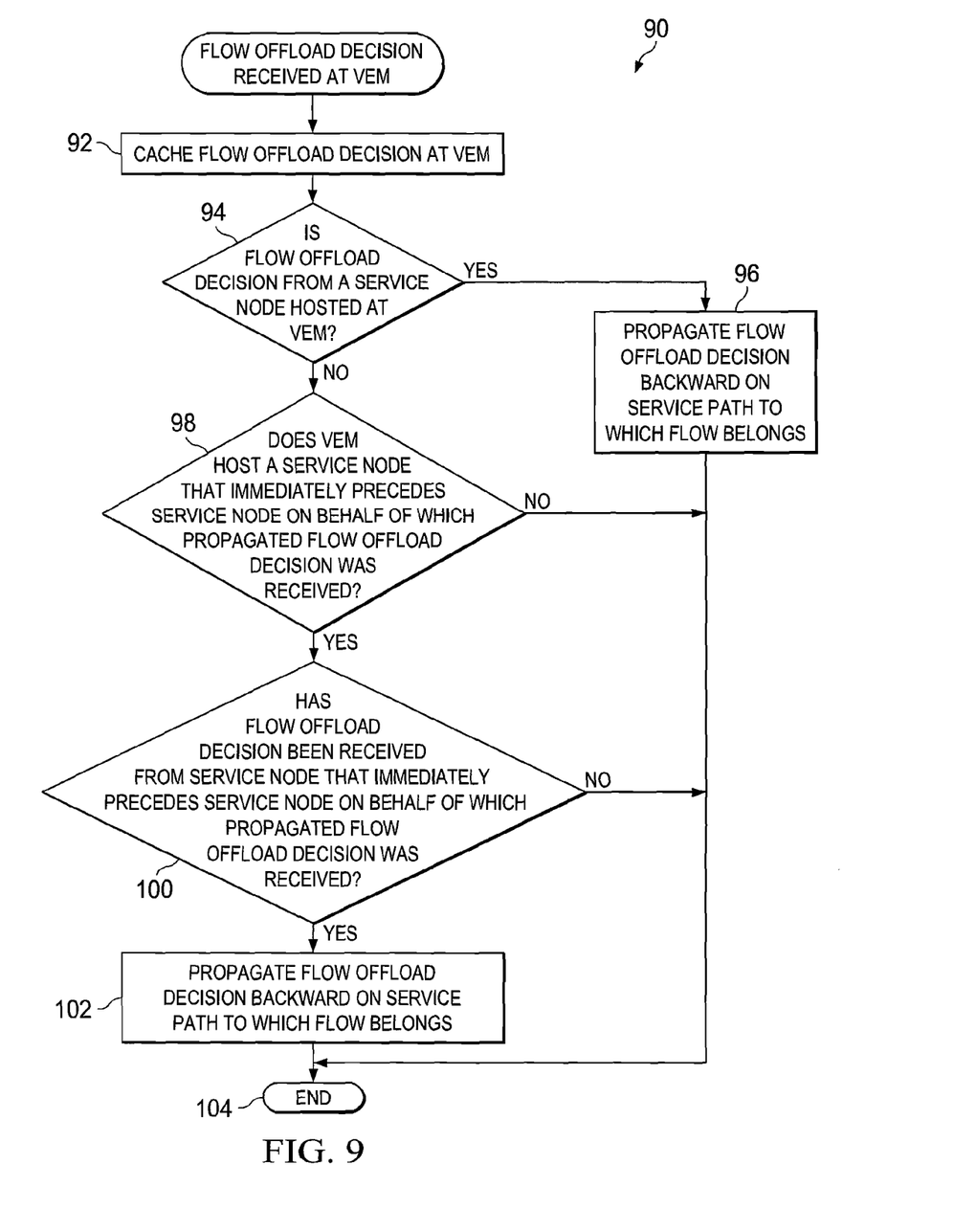
FIG. 9 is a simplified flowchart illustrating additional example operations that may be associated with an embodiment of the present disclosure for performing distributed service chaining in a network environment.

FIG. 9 is a simplified flow diagram illustrating example operations 90 that may be associated with an embodiment for shortening service paths in service chains in a communications system, such as the system 10, upon receipt at a VEM (and/or vPath) of a flow offload decision. Referring now to FIG. 9, in step 92, in response to receipt of a flow offload decision, the decision is cashed at the VEM. In step 94, a determination is made whether the flow offload decision is from a service node hosted by the VEM. If so, in step 96 the flow offload decision is propagated backwards on the service path to which the flow belongs. If the flow offload decision is not received from a service node hosted by the VEM but rather from another VEM in the service path, in step 98, a determination is made whether the VEM hosts a service node that immediately precedes the service node on behalf of which the propagated flow offload decision was received. If a positive determination is made in step 98, in step 100, a determination is made whether the VEM has received a flow offload decision from the service node that immediately precedes the service node on behalf of which the propagated flow offload decision is received. If a positive determination is made in step 100, in step 102, the VEM propagates the flow offload decision further on the service path in the same direction it was received. If a negative determination is made in either step 98 or 100, execution terminates in step 104. Similarly, upon completion of step 96 or 102, execution terminates in step 104.

Figure 10:
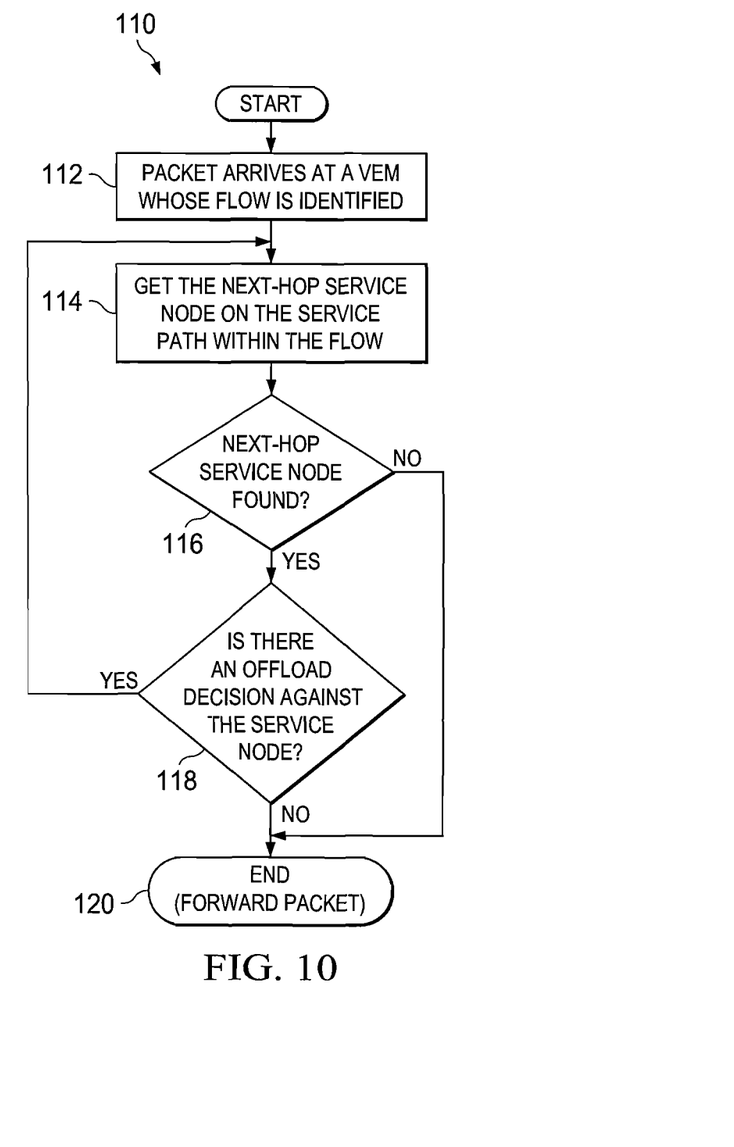
FIG. 10 is a simplified flowchart illustrating additional example operations that may be associated with an embodiment of the present disclosure for performing service chaining in a network environment.

FIG. 10 is a simplified flow diagram illustrating additional example operations 110 that may be associated with an embodiment for shortening service paths in service chains in a communications system, such as the system 10, in response to arrival of a packet at a VEM. Referring now to FIG. 10, in step 112, a packet arrives at a VEM and its flow, which also contains the service path for the packet, is identified. In step 114, the service forwarding table for the VEM is referenced to determine the next-hop service node on the service path within the flow. In step 116, a determination is made whether the next hop service node has been found. If so, execution continues to step 118, in which a determination is made whether an offload decision has been cached against the next hop service node. If a negative determination is made in step 118, execution terminates in step 120 and the packet is forwarded to the next hop service node as indicated in the service forwarding table. In contrast, if a positive determination is made in step 118, execution returns to step 114. Returning to step 116, if a negative determination is made in step 116, execution proceeds directly to step 120.

In accordance with embodiments described and illustrated herein, certain extensions are made to the distributed service chaining technique described above to shorten the service path. In particular, the service forwarding table for each vPath is extended to include the previous hop, as well as the next hop. Additionally, flow offload decisions are propagated backwards on a service path. Finally, flow offload decisions from all of the service nodes at a given vPath, as well as the flow offload decision from the next service node on the service path from another vPath, are cached.

In one example implementation, various nodes involved in implementing the embodiments described herein can include software for achieving the described functions. For example, DVS 12 each of the routers of the embodiments described herein, may include a service path shortening module, which comprises software embodied in one or more tangible media for facilitating the activities described herein. The DVS 12 may also include a memory device for storing information to be used in achieving the functions as outlined herein. Additionally, the DVS 12 may include a processor that is capable of executing software or an algorithm (such as embodied in the service path shortening module) to perform the functions as discussed in this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor or other similar machine in, for example, DVS 12. In some embodiments, one or more of these features may be implemented in hardware, provided external to these elements, or consolidated in any appropriate manner to achieve the intended functionality. The various network elements (e.g., DVS 12, service controller 16) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, DVS 12 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements, such as may be inherent in VEMs 18, can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors, such as may be inherent in VEMs 18, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving at a network element a flow offload decision for a first service node comprising a portion of a service chain for processing a flow;
   recording the flow offload decision against the first service node at the network element;
   propagating the flow offload decision backward on a service path to which the flow belongs when the first service node is hosted at the network element; and
   propagating the flow offload decision backward on the service path to which the flow belongs when the flow offload decision is a propagated flow offload decision and:
   the network element hosts a second service node that immediately precedes the first service node; and the flow offload decision has already been received by the network element for the second service node.

2. The method of claim 1 further comprising recording the flow offload decision against the first service node at each additional network element to which the flow offload decision is propagated.

3. The method of claim 1, wherein the network element comprises a Virtual Ethernet Module ("VEM") including a distributed virtual switch ("DVS").

4. The method of claim 1 further comprising providing at the network element a service forwarding table associated with the flow, the service forwarding table including an entry corresponding to each service node of the service chain hosted by the network element, wherein each entry indicates a next hop and a previous hop for the corresponding service node of the service chain.

5. The method of claim 4, wherein the propagating comprises propagating the flow offload decision to the previous hop indicated in the service forwarding table entry corresponding to the first service node.

6. The method of claim 4, wherein the recording comprises indicating in the service forwarding table that the first service node has been offloaded for the flow.

7. The method of claim 6 further comprising forwarding a packet of the flow received at the network element to a next hop service node as indicated by the service forwarding table, wherein when a corresponding service table entry indicates that the next hop service node has been offloaded, the packet is forwarded to a first next hop service node in the service chain that has not been offloaded.

8. One or more non-transitory tangible media that includes code for execution and when executed by a processor is operable to perform operations, comprising:
receiving at a network element a flow offload decision for a first service node comprising a portion of a service chain for processing a flow;
recording the flow offload decision against the first service node at the network element;
propagating the flow offload decision backward on a service path to which the flow belongs when the first service node is hosted at the network element; and propagating the flow offload decision backward on the service path to which the flow belongs when the flow offload decision is a propagated flow offload decision and: the network element hosts a second service node that immediately precedes the service node on behalf of which the propagated flow offload decision was received; and the flow offload decision has already been received by the network element from the second service node.

9. The one or more non-transitory tangible media of claim 8 further comprising recording the flow offload decision against the first service node at each additional network element to which the flow offload decision is propagated.

10. The one or more non-transitory tangible media of claim 8 further comprising providing at the network element a service forwarding table associated with the flow, the service forwarding table including an entry corresponding to each service node of the service chain hosted by the network element, wherein each entry indicates a next hop and a previous hop for the corresponding service node of the service chain.

11. The one or more non-transitory tangible media of claim 10, wherein the propagating comprises propagating the flow offload decision to the previous hop indicated in the service forwarding table entry corresponding to the first service node.

12. The one or more non-transitory tangible media of claim 10, wherein the recording comprises indicating in the service forwarding table that the first service node has been offloaded for the flow.

13. The one or more non-transitory tangible media of claim 12 further comprising forwarding a packet of the flow received at the network element to a next hop service node as indicated by the service forwarding table, wherein when a corresponding service table entry indicates that the next hop service node has been offloaded, the packet is forwarded to a first next hop service node in the service chain that has not been offloaded.

14. An apparatus, comprising: a memory element configured to store data; a processor operable to execute instructions associated with the data; and a service path shortening module configured to: receive at a network element a flow offload decision for a first service node comprising a portion of a service chain for processing a flow; record the flow offload decision against the first service node at the network element; propagate the flow offload decision backward on a service path to which the flow belongs when the first service node is hosted at the network element; and propagate the flow offload decision backward on the service path to which the flow belongs when the flow offload decision is a propagated flow offload decision and: the network element hosts a second service node that immediately precedes the service node on behalf of which the propagated flow offload decision was received; and the flow offload decision has already been received by the network element from the second service node.

15. The apparatus of claim 14, wherein the service path shortening module is further configured to provide at the network element a service forwarding table associated with the flow, the service forwarding table including an entry corresponding to each service node of the service chain hosted by the network element, wherein each entry indicates a next hop and a previous hop for the corresponding service node of the service chain.

16. The apparatus of claim 15, wherein the propagating comprises propagating the flow offload decision to the previous hop indicated in the service forwarding table entry corresponding to the first service node and wherein the recording comprises indicating in the service forwarding table that the first service node has been offloaded for the flow.

17. The apparatus of claim 16, wherein the service path shortening module is further configured to forward a packet of the flow received at the network element to a next hop service node as indicated by the service forwarding table, wherein when a corresponding service table entry indicates that the next hop service node has been offloaded, the packet is forwarded to a first next hop service node in the service chain that has not been offloaded.

* * * * *